US009842341B2

(12) United States Patent
Koch et al.

(10) Patent No.: US 9,842,341 B2
(45) Date of Patent: Dec. 12, 2017

(54) NON-SUBJECTIVE QUALITY ANALYSIS OF DIGITAL CONTENT ON TABLETOP DEVICES

(71) Applicant: INTERNATIONAL BUSINESS MACHINES CORPORATION, Armonk, NY (US)

(72) Inventors: Fernando L. Koch, Sao Paulo (BR); Nicole B. Sultanum, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 758 days.

(21) Appl. No.: 14/265,947

(22) Filed: Apr. 30, 2014

(65) Prior Publication Data
US 2015/0319263 A1 Nov. 5, 2015

(51) Int. Cl.
| | |
|---|---|
| G06Q 10/10 | (2012.01) |
| G06Q 30/02 | (2012.01) |
| H04L 29/08 | (2006.01) |
| G06F 3/0484 | (2013.01) |

(52) U.S. Cl.
CPC .......... *G06Q 30/02* (2013.01); *G06F 3/0484* (2013.01); *G06Q 10/101* (2013.01); *H04L 67/1095* (2013.01); *H04L 67/306* (2013.01)

(58) Field of Classification Search
CPC .... G06F 3/04883; G06F 3/017; G06F 3/0481; G06Q 10/10
See application file for complete search history.

(56) References Cited

U.S. PATENT DOCUMENTS

| | | | |
|---|---|---|---|
| 5,762,611 A | 6/1998 | Lewis et al. | |
| 6,487,444 B2 | 11/2002 | Mimura | |
| 6,915,104 B2 | 7/2005 | Yonezu et al. | |
| (Continued) | | | |

FOREIGN PATENT DOCUMENTS

| | | |
|---|---|---|
| WO | 2009143286 | 11/2009 |
| WO | 2009152576 | 12/2009 |
| WO | 2011056488 | 5/2011 |

OTHER PUBLICATIONS

Ahmed Kharrufa, et al., "Digital mysteries: designing for learning at the tabletop" In (ITS '10). ACM, New York, NY USA, pp. 197-206.
(Continued)

*Primary Examiner* — Mahelet Shiberou
(74) *Attorney, Agent, or Firm* — F. Chau & Associates, LLC.

(57) ABSTRACT

A method of evaluating digital content displayed on an electronic tabletop device includes receiving a plurality of non-intentional signals generated in response to a plurality of users interacting with at least one of the digital content displayed on the electronic tabletop device and each other, classifying the plurality of non-intentional signals into a first set of data including user-specific non-intentional signals and a second set of data including collaborative non-intentional signals, correlating the plurality of non-intentional signals to user profiles corresponding to the plurality of users, and generating an evaluation report including information indicating a collaborative quality of the digital content based on the plurality of non-intentional signals and a correlation of the plurality of non-intentional signals to the user profiles.

13 Claims, 6 Drawing Sheets

(56) References Cited

U.S. PATENT DOCUMENTS

| | | | |
|---|---|---|---|
| 7,363,643 B2 | 4/2008 | Drake et al. | |
| 7,827,486 B2 | 11/2010 | Mayer-Ullmann | |
| 8,006,259 B2 | 8/2011 | Drake et al. | |
| 8,032,539 B2 | 10/2011 | Ebadollahi et al. | |
| 9,606,705 B2* | 3/2017 | Olsen | G06F 3/0484 |
| 2005/0060221 A1 | 3/2005 | Kolar et al. | |
| 2006/0225003 A1 | 10/2006 | Agogino et al. | |
| 2006/0287068 A1* | 12/2006 | Walker | G07F 17/3237 463/25 |
| 2008/0215170 A1 | 9/2008 | Milbrandt et al. | |
| 2009/0100068 A1 | 4/2009 | Gauba et al. | |
| 2009/0125934 A1 | 5/2009 | Jones et al. | |
| 2010/0169792 A1* | 7/2010 | Ascar | G06F 11/3414 715/744 |
| 2010/0251128 A1* | 9/2010 | Cordasco | G06F 11/328 715/736 |
| 2011/0055729 A1* | 3/2011 | Mason | G06F 3/0425 715/753 |
| 2012/0022951 A1* | 1/2012 | Tolompoiko | G06Q 30/0241 705/14.68 |
| 2012/0110471 A2* | 5/2012 | Kummerfeld | G06Q 10/10 715/750 |
| 2012/0178529 A1 | 7/2012 | Collard et al. | |
| 2012/0289147 A1 | 11/2012 | Raleigh et al. | |
| 2013/0031208 A1* | 1/2013 | Linton | H04L 67/125 709/217 |
| 2013/0054636 A1* | 2/2013 | Tang | G06F 17/241 707/769 |
| 2014/0368436 A1* | 12/2014 | Abzarian | G06F 3/0488 345/168 |

OTHER PUBLICATIONS

Ahmed Kharrufa, et al., "Exploring the requirements of tabletop interfaces for education", vol. 5. No. 1, pp. 42.

Stacey D. Scott, et al., "System guidelines for co-located, collaborative learning activity around an interactive tabletop", In (ECSCW'03), Kluwer Academic Publishers, Norwell, MA, USA, pp. 159-178.

R. Martinez, et al., "Analysing frequent sequential patterns of collaborative learning activity around an interactive tapletop", In Proceedings of the 4th International Conference on Educational Data Mining, EDM2011, 2011.

R. Martinez, et al., "Who did what? Who said that? Collaid: an environment for capturing traces of collaborative learning at the tabletop", Paper presented at the ACM International Conference on Interactive Tabletops and Surfaces, Kobe, Japan (2011).

* cited by examiner

NON-SUBJECTIVE QUALITY ANALYSIS OF DIGITAL CONTENT ON TABLETOP DEVICES

BACKGROUND

1. Technical Field

Exemplary embodiments of the present invention relate to non-subjective quality analysis of digital content on tabletop devices, and more particularly, to a system and method of non-subjective quality analysis of digital content on tabletop devices.

2. Discussion of Related Art

Electronic tabletop devices allow multiple users to simultaneously interact with digital content and with each other in a digital environment, and have great potential for collaborative interchange between users. For example, in an educational environment, students may use an electronic tabletop device to interact with digital information in a collaborative manner. The overall quality and effectiveness of digital content being presented via an electronic tabletop device is impacted by how well the digital content utilizes the available resources and features of the electronic tabletop device. Evaluating the interaction between users and the digital content displayed on the electronic tabletop device, as well as between users and other users of the electronic tabletop device, can provide insight relating to the quality of the digital content, allowing for improvements to be made to non-effective digital content, and for effective digital content to be used as a model for other digital content.

SUMMARY

According to an exemplary embodiment of the present invention, a method of evaluating digital content displayed on an electronic tabletop device includes receiving a plurality of non-intentional signals generated in response to a plurality of users interacting with at least one of the digital content displayed on the electronic tabletop device and each other, classifying the plurality of non-intentional signals into a first set of data comprising user-specific non-intentional signals and a second set of data comprising collaborative non-intentional signals, wherein each of the user-specific non-intentional signals corresponds to an individual touch interaction occurring between one user from among the plurality of users and the digital content, and each of the collaborative non-intentional signals corresponds to a collaborative action occurring between at least two users from among the plurality of users, correlating the plurality of non-intentional signals to user profiles corresponding to the plurality of users, and generating an evaluation report including information indicating a collaborative quality of the digital content based on the plurality of non-intentional signals and a correlation of the plurality of non-intentional signals to the user profiles.

In an exemplary embodiment, the collaborative action includes a collaborative touch interaction occurring between the at least two users and the digital content.

In an exemplary embodiment, the collaborative touch interaction occurring between the at least two users and the digital content includes sharing data objects of the digital content between the at least two users.

In an exemplary embodiment, the method further includes recording speech communication data corresponding to a verbal interchange occurring between the at least two users, and the collaborative action includes the verbal interchange.

In an exemplary embodiment, the individual touch interaction includes touching a data object of the digital content.

In an exemplary embodiment, the method further includes recording speech communication data corresponding to a verbal interchange occurring between the at least two users. The collaborative action is a first collaborative action of at least two collaborative actions, the first collaborative action includes a collaborative touch interaction occurring between the at least two users and the digital content, and a second collaborative action of the at least two collaborative actions includes the verbal interchange.

In an exemplary embodiment, the collaborative touch interaction occurring between the at least two users and the digital content includes sharing data objects of the digital content between the at least two users.

In an exemplary embodiment, the electronic tabletop device is a first electronic tabletop device, and the plurality of users includes a first group of co-located users interacting with the digital content using the first electronic tabletop device at a first location, and a second group of remotely located users interacting with the digital content using a second electronic tabletop device at a second location, different from the first location. The first and second electronic tabletop devices are in communication with and are synchronized with each other.

In an exemplary embodiment, the method further includes constructing a weighted social graph using the collaborative non-intentional signals and the user profiles. Nodes of the weighted social graph represent the plurality of users, and weighted links connecting the nodes represent a quality of collaboration between the respective nodes. The weighted social graph indicates the collaborative quality of the digital content.

According to an exemplary embodiment of the present invention, a method of evaluating digital content displayed on an electronic device includes receiving a plurality of non-intentional signals generated in response to a plurality of users interacting with at least one of the digital content and each other, wherein the plurality of non-intentional signals are provided by the users non-intentionally, analyzing the received plurality of non-intentional signals, and generating an evaluation report including information indicating a collaborative quality of the digital content based on an analysis of the plurality of non-intentional signals.

According to an exemplary embodiment of the present invention, a computer program product for evaluating digital content displayed on an electronic tabletop device includes a computer readable storage medium having program instructions embodied therewith, the program instructions executable by a processor to cause the processor to perform a method including receiving a plurality of non-intentional signals generated in response to a plurality of users interacting with at least one of the digital content displayed on the electronic tabletop device and each other, classifying the plurality of non-intentional signals into a first set of data including user-specific non-intentional signals and a second set of data comprising collaborative non-intentional signals, wherein each of the user-specific non-intentional signals corresponds to an individual touch interaction occurring between one user from among the plurality of users and the digital content, and each of the collaborative non-intentional signals corresponds to a collaborative action occurring between at least two users from among the plurality of users, correlating the plurality of non-intentional signals to user profiles corresponding to the plurality of users, and generating an evaluation report including information indicating a collaborative quality of the digital content based on the plurality of non-intentional signals and a correlation of the plurality of non-intentional signals to the user profiles.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

Exemplary embodiments of the present invention provide a system and method for evaluation and non-subjective quality analysis of digital content being used on an electronic tabletop device. As used herein, an electronic tabletop device refers to any electronic device including a display and a touchscreen input device that receives input from a user(s) via a touch interface. Although exemplary embodiments described herein refer primarily to a tabletop device having a large display and disposed in a tabletop configuration such that the display is disposed parallel to a floor surface, it is to be understood that exemplary embodiments are not limited thereto. For example, exemplary embodiments of the present invention may be implemented with any electronic device (e.g., a tablet computer) including a display and a touchscreen interface.

Electronic tabletop devices provide a multi-user collaboration environment in which users may interact with digital content and with each other. According to exemplary embodiments of the present invention, non-intentional signals generated by users using an electronic tabletop device may be collected, classified, and analyzed. The non-intentional signals may include signals generated by users when individually interacting with the digital content displayed on the tabletop device, and signals generated as the result of co-manipulation of the digital content among multiple users. The non-intentional signals may include signals collected via the touchscreen input device of the tabletop device such as, for example, gestures, zooming actions, tapping, interaction with objects, etc., as well as verbal interchange occurring between users near the tabletop device. The non-intentional signals may be generated based on users that are co-located (e.g., users in one location using the same tabletop device), and/or users that are remotely located (e.g., users in at least two different locations using different tabletop devices in communication with each other).

The overall quality of the digital content displayed on the tabletop device ultimately relates to how well the digital content is understood and absorbed by the users, and may be indicated by several factors including, for example, whether content navigation tools of the digital content are successfully directing users to sought information, whether the digital content is perceived as being clear, unambiguous, and pleasant, whether the digital content fosters constructive discussions and continued interest in the topic relating to the digital content, etc. According to exemplary embodiments of the present invention, these factors, and similar factors, may be inferred based on other collected data including, for example, non-intentional signals provided by users of the tabletop device, as described in detail below. For example, a constant back-and-forth verbal interchange between users may indicate that the digital content is confusing, repeated taps in the same area of the tabletop device within a short period of time may indicate that the size of interaction elements in this area is too small, little verbal interchange between users may indicate that the digital content is too individually-geared and is not prompting discussion, etc. The non-intentional signals collected and analyzed in exemplary embodiments of the present invention allow for many of these factors to be inferred, and can be used to delineate successful implementations and detect faulty implementations. Since the feedback received is not intentionally provided by the users and is provided without the knowledge of the users, the quality of the digital content may be evaluated in an unbiased manner.

Exemplary embodiments of the present invention produce evaluation feedback indicating the quality of the digital content displayed on the tabletop device. The evaluation feedback is derived from the generated non-intentional signals, and may be embodied, for example, as readable documents (e.g., an evaluation report) reporting on the quality of the digital content. The evaluation feedback may provide actionable insight relating to the digital content, allowing for the adjustment, improvement, and optimization of the digital content.

Figure 1:
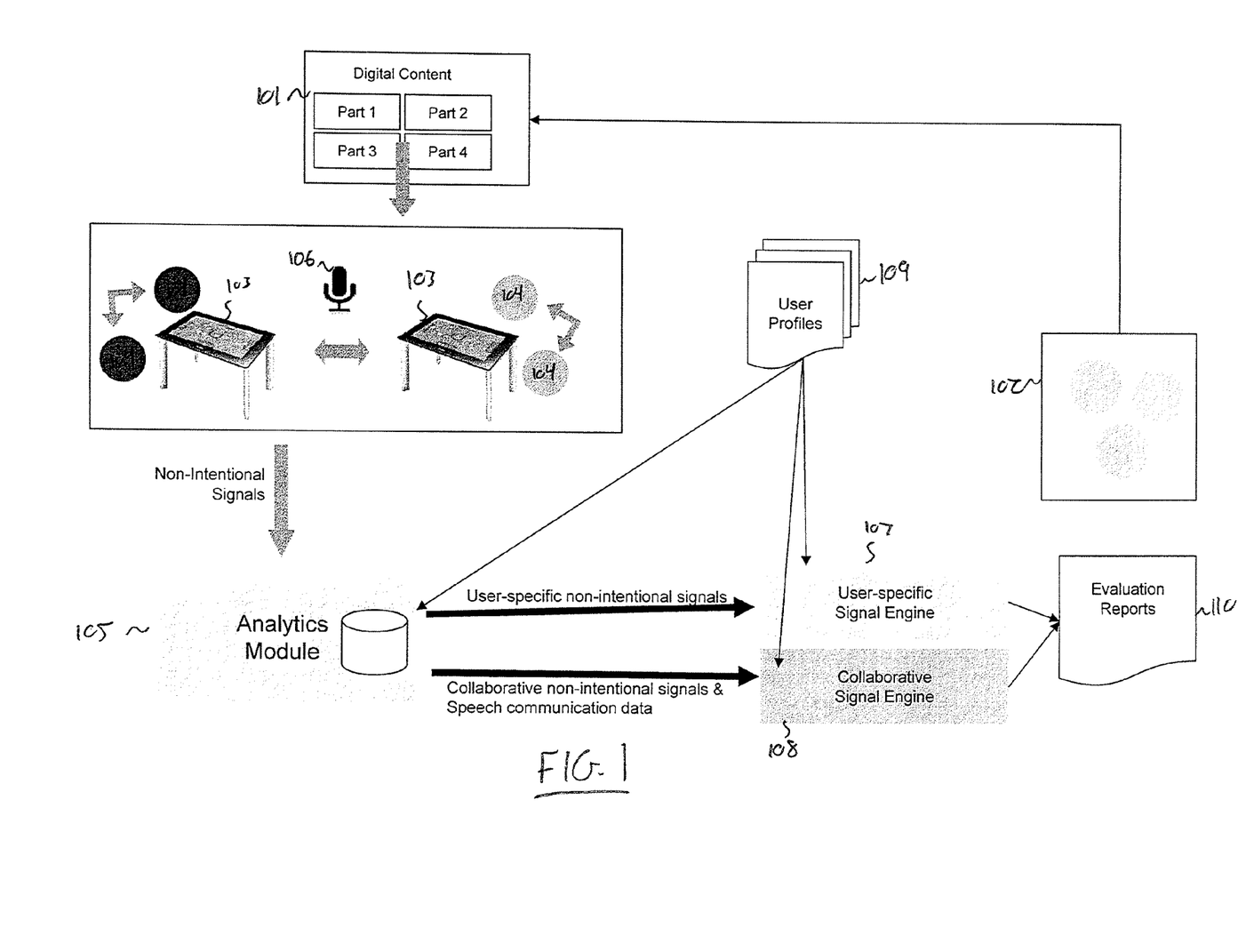
FIG. 1 shows an overview of a system in which non-subjective quality evaluation of digital content displayed on a tabletop device is performed, according to an exemplary embodiment of the present invention.

FIG. 1 shows an overview of a system in which non-subjective quality evaluation of digital content displayed on a tabletop device is performed, according to an exemplary embodiment of the present invention.

Referring to FIG. 1, digital content 101 may be delivered to an electronic tabletop device 103 via a digital interface module. The digital content 101 may include, for example, digital education material intended to be consumed by students in an educational environment, however exemplary embodiments of the present invention are not limited thereto. The digital content 101 may be generated by a number of sources 102. For example, the digital content 101 may be manually created by a software designer, educator, etc., or may be automatically created by a computational system. The digital content 101 may include a plurality of parts (e.g., Part 1, Part 2, Part 3, Part 4) including, for example, data objects and sets of data objects.

The digital content 101 is delivered to an electronic tabletop device 103. A delivery application executed on the tabletop device 103 presents the digital content 103, and collects data regarding the manipulation of the digital content 103 by the users 104, for example, via the touchscreen input device of the tabletop device 103. This data may be referred to as utilization events. Utilization events may further include environmental data such as, for example, group distribution and user location around the tabletop device 103, as well as speech communication data corresponding to verbal interchange (e.g., speech events) between the users 104 of the tabletop device 103. This speech communication data may be recorded by a speech capture component 106 disposed in or near the tabletop device 103. That is, the speech capture component 106 may be embedded within the tabletop device 103 or may be a standalone unit located near the tabletop device 103. The recorded speech communication data may correspond to co-located users 104 and/or remotely located users 104. Once captured by the speech capture component 106, the speech communication data is transmitted to and processed by a speech processing component 200, which is described in further detail with reference to FIG. 2.

Figure 2:
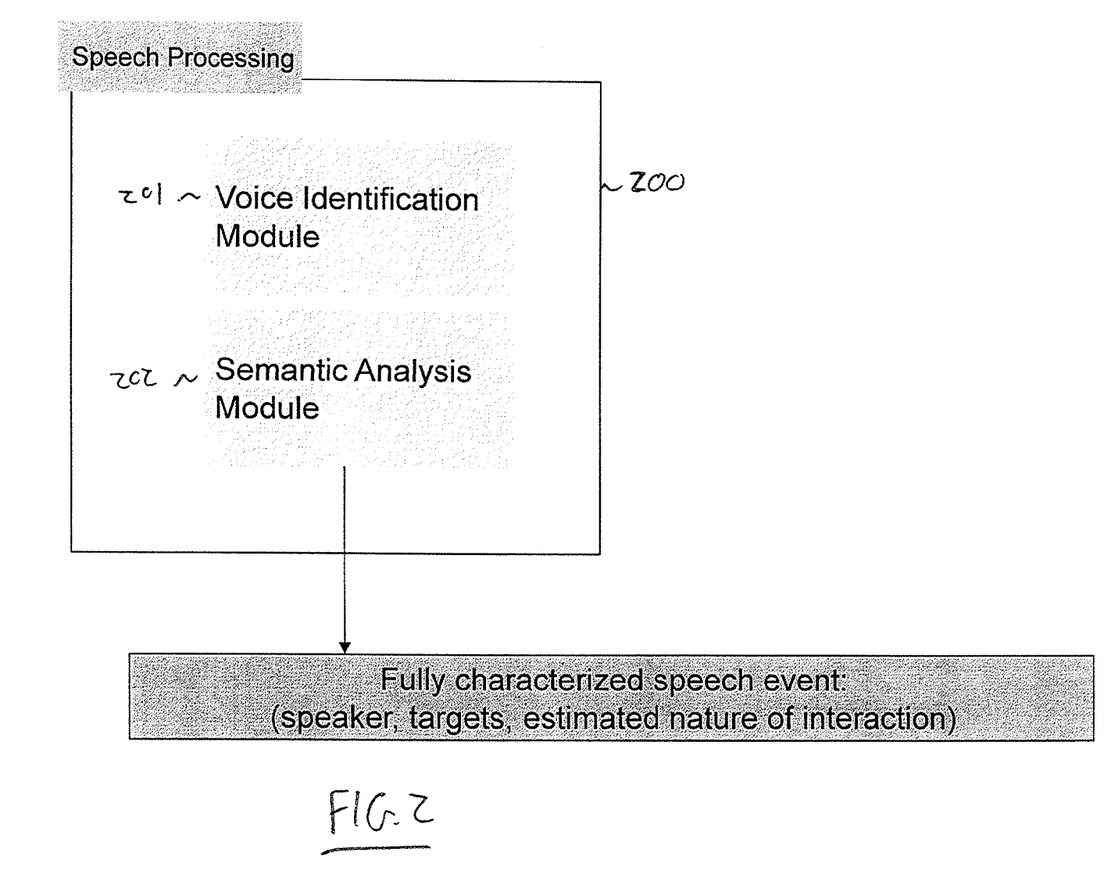
FIG. 2 shows a block diagram of the speech processing component of FIG. 1, according to an exemplary embodiment of the present invention.

FIG. 2 shows a block diagram of the speech processing component, according to an exemplary embodiment of the present invention.

Referring to FIG. 2, the speech processing component 200 includes a voice identification module 201 and a semantics analysis module 202. The voice identification module 201 analyzes the speech communication data and determines the identity of the speakers. The semantics analysis module 202 extracts the intent, nature, and target(s) of the communication, and may provide additional data to characterize the collaborative learning experience. The speech processing component 200 uses the information obtained via the voice identification module 201 and the semantics analysis module 202 to output fully characterized speech events, which may include the speaker, the target of the verbal interchange, and an estimated nature of the verbal interchange. The speech processing component 200 may be disposed at different locations. For example, the speech processing component 200 may be embedded within the tabletop device 103 or located near the tabletop device 103 with the speech capture component 106, or may be remotely located from the tabletop device 103 and the speech capture component 106. When the speech processing component 200 is remotely located, the speech communication data may be transmitted from the speech capture component 106 to the speech processing component 200 via, for example, an Internet connection. As a result, the speed and efficiency of speech processing may be improved by disposing the speech processing component 200 in a remotely located system having high computational power.

As described above, the digital content 101 may be consumed by multiple users 104 via the tabletop device 103 in a collaborative environment in which users 104 interact with the digital content 101 and interact with each other 104. Non-intentional signals are generated as the result of these interactions.

The non-intentional signals may be classified as different types of signals. For example, a first type of non-intentional signal is a user-specific non-intentional signal, a second type of non-intentional signal is a collaborative non-intentional signal, and a third type of non-intentional signal is speech communication data. Speech communication data may be considered to be a subset of collaborative non-intentional signals.

A user-specific non-intentional signal is generated based on an individual user's interaction with the digital content 101. For example, a user-specific non-intentional signal is generated based on individual content manipulation of the digital content 101 performed by a single user. User-specific non-intentional signals correspond to individual touch interactions involving a single user rather than collaborative actions involving multiple users. For example, a user-specific non-intentional signal may correspond to an interaction occurring between only a single user and the digital content 101. A single user performing an action such as, for example, tapping on a displayed object, performing a zooming action, interacting directly with a displayed object, or performing any other gestures directly with a displayed object, generates user-specific non-intentional signals (e.g., signals that are non-intentionally provided by a user when interacting with the digital content 101).

A collaborative non-intentional signal is generated based on an interaction occurring between at least two users of the digital content 101. For example, a collaborative non-intentional signal may be generated based on material sharing or a transfer of material between users such as, for example, one user passing a data object displayed on the tabletop device 103 to another user. Collaborative non-intentional signals correspond to collaborative actions involving multiple users (e.g., at least two users), and may include touch interactions (e.g., gestural events) and/or verbal interactions (e.g., voice events), as described below.

Speech communication data corresponds to verbal interchange occurring between users of the digital content 101. Speech communication data is a type of collaborative non-intentional signal. Analysis of speech communication data including, for example, the frequency and length of verbal interchanges between users, may provide additional insight relating to the collaborative quality of the digital content 101.

Referring again to FIG. 1, the users 104 may be co-located relative to one tabletop device 103, and/or may be remotely located and using two different tabletop devices 103 that are in communication with each other. Tabletop devices 103 may be in communication with each other via, for example, a wireless Internet connection. When remotely located users 104 interact with the digital content 101, the delivery application may update content changes to the digital content 101 so that the digital content 101 is synchronized across all locations. Both user-specific non-intentional signals and collaborative non-intentional signals, including speech communication data, may be generated based on co-located users and/or remotely located users.

The non-intentional signals are transmitted from the tabletop device 103 to an analytics module 105. The analytics module 105 may include a storage database and a processing/filtering component. The non-intentional signals may be stored in the storage database, and then processed by the processing/filtering component. Processing may include indexing and aggregating the stored data, and classifying the stored data. For example, the non-intentional signals may be classified into a first set of data including the user-specific non-intentional signals, and a second set of data including the collaborative non-intentional signals. In addition, processing can be performed to identify additional characteristics regarding the data. Additional characteristics may include, for example, an identification of the user that generated the event (U), the type of interaction event that resulted in generating the signal (I), an optional content object component (O), and an optional list of target users affected by the respective event (T). In an exemplary embodiment, this processed data may be represented using a tuple: $(U, I, [O]^{0,1}, [T]^{0\text{-}*})$.

Once the data generated at the tabletop device 103 has been processed by the analytics module 105, the processed data is transmitted to a user-specific signal engine 107 and a collaborative signal engine 108. The user-specific signal engine 107 corresponds to an evaluation model for user-specific non-intentional signals, and the collaborative signal engine 108 corresponds to an evaluation model for collaborative non-intentional signals. The analytics module 105 transmits the user-specific non-intentional signals to the user-specific signal engine 107, and transmits the collaborative non-intentional signals, including the speech communication data, to the collaborative signal engine 108.

The user-specific signal engine 107 correlates the user-specific non-intentional signals to user profiles 109 and social setting information. The user-specific signal engine 107 generates evaluation reports 110 summarizing group reaction toward the digital content 101 based on the user-specific non-intentional signal. That is, the user-specific signal engine 107 generates evaluation data based on the user-specific non-intentional signals. Group reaction may reflect, for example, the quality of the digital content 101 in terms of organization of memory and learning, focus and attention, perception, categorization and preference, motivation and performance, etc.

The collaborative signal engine 108 processes collaborative events generated by group interaction with the tabletop device 103 (e.g., collaborative non-intentional signals including speech communication data). The collaborative signal engine 108 may correlate the collaborative non-intentional signals with user profiles 109 and social setting information, and may determine factors such as, for example, user orientation around the tabletop device 103, user proximity (e.g., to each other and to the tabletop device 103), and speech events occurring between users. Utilization of the collaborative non-intentional signals together with user data allows for the delineation of characteristics of both co-located and remote collaborative activity. The collaborative signal engine 108 generates evaluation reports 110 relating to group interaction and reaction toward the digital content 101 with a focus on the collaborative and synergistic aspects of the interactions. That is, the collaborative signal engine 108 generates evaluation data based on the collaborative non-intentional signals, including speech communication data.

Figure 3:
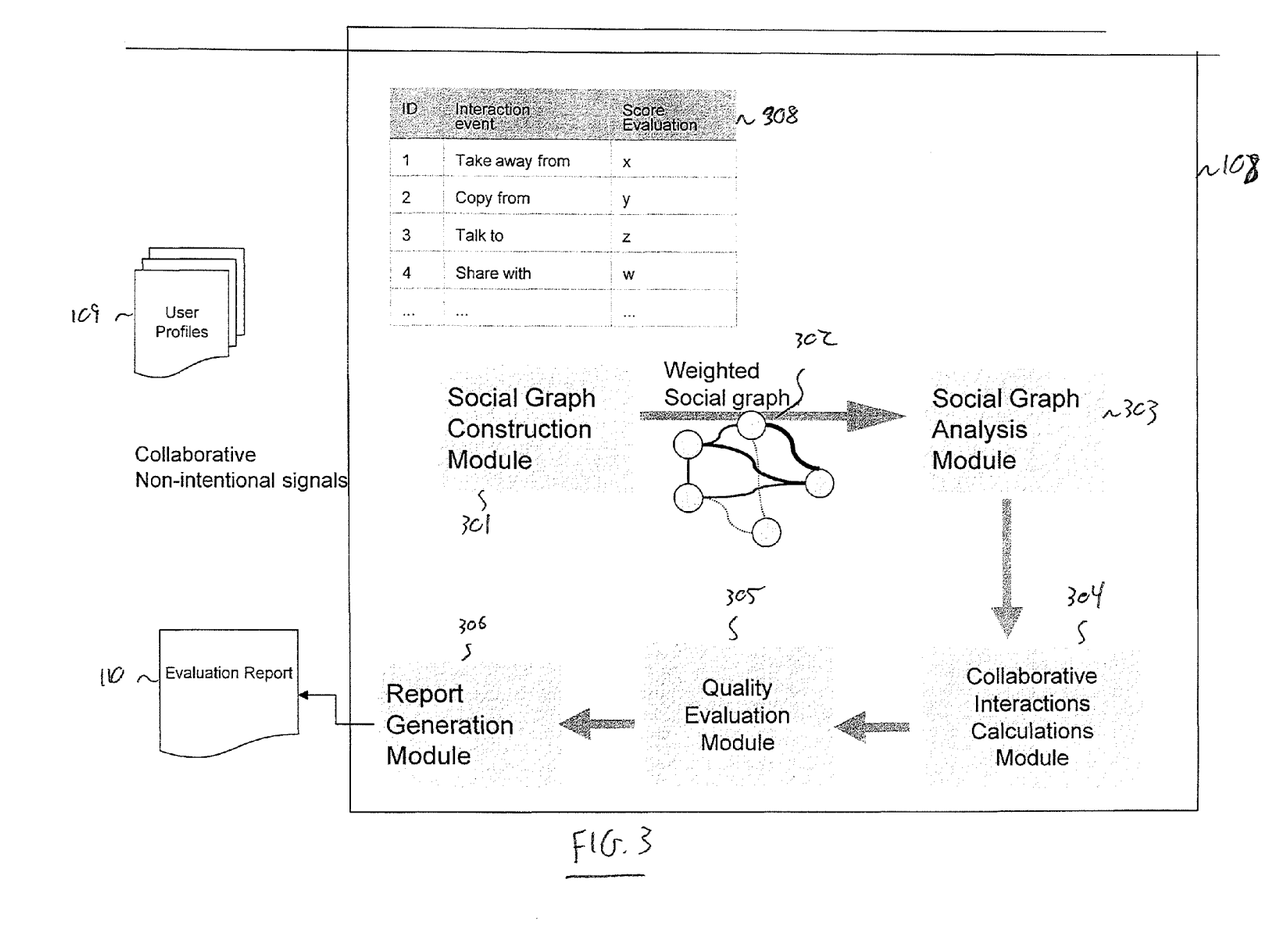
FIG. 3 is a flow diagram showing an overview of the collaborative signal engine of FIG. 1, according to an exemplary embodiment of the present invention.

FIG. 3 is a flow diagram showing an overview of the collaborative signal engine of FIG. 1, according to an exemplary embodiment of the present invention.

Collaborative non-intentional signals, including speech communication data, as well as data extracted from the user profiles 109, are received at a social graph construction module 301. The received data is used to create a weighted social graph 302. The weighted social graph 302 represents an overall view of the collaborative experience enabled by the digital content 101. In the weighted social graph 302, participating users may be represented as nodes, and the weighted links between the nodes may represent the quality of collaboration between the nodes. Multiple links may be connected between nodes to characterize various collaborative aspects (e.g., to characterize different interactions between the users relating to different aspects of the digital content 101). The weighted links indicate the effectiveness of the different interactions between the different users. Thus, the weighted social graph 302 provides an indication of the quality of collaborative interaction between the users.

In an exemplary embodiment, the weighted links may be scored using a lookup table 308 indicating the positive, negative, or neutral impact of each interaction, allowing for the collaborative learning experience to be characterized and evaluated. For example, the lookup table 308 shown in FIG. 3 indicates a score evaluation x corresponding to an interaction event in which one user takes an object displayed on the tabletop device 103 away from another user, a score evaluation y corresponding to an interaction event in which one user copies an object displayed on the tabletop device 103, a score evaluation z corresponding to an interaction in which users talk to each other, and a score evaluation w corresponding to an interaction in which a user shares an object displayed on the tabletop device 103 with another user. It is to be understood that the lookup table 308 shown in FIG. 3 is exemplary, and that the interaction events included in the lookup table 308 are not limited thereto.

A social graph analysis module 303 analyzes the weighted social graph 302 generated by the social graph construction module 301 to identify characteristics of the collaboration occurring between users when using the digital content 101. Identified characteristics may include, for example, the overall level of collaboration between users, a profile detailing local collaboration performance compared to remote collaboration performance, the uniformity of collaboration among all users, which forms of collaboration are most prevalent, and an indication of factors that may potentially indicate any negative impact to collaboration.

A collaborative interactions calculation module 304 receives the results generated by the social graph analysis module 303, and calculates collaborative interactions on the tabletop device 103 based on these results. The calculated collaborative interactions are then passed to a quality evaluation module 305 that calculates the overall rating for the digital content 101. The overall rating is translated to a human-readable format by a report generation module 306, and the evaluation report 110 summarizing the quality of the digital content 101 based on the user interaction is output. As described above, the generated evaluation report 110 may be utilized to evaluate the quality of the digital content 101, and provide insight relating to how the digital content 101 may be adjusted and further improved. For example, system administrators, content designers, educators, and other parties may utilize the evaluation report 110 to evaluate the quality of the digital content 101 (e.g., to evaluate whether the digital content 101 is accessible, is contributing to synergy, collaboration and uniform progress among students if used in an educational environment, etc).

Figure 4:
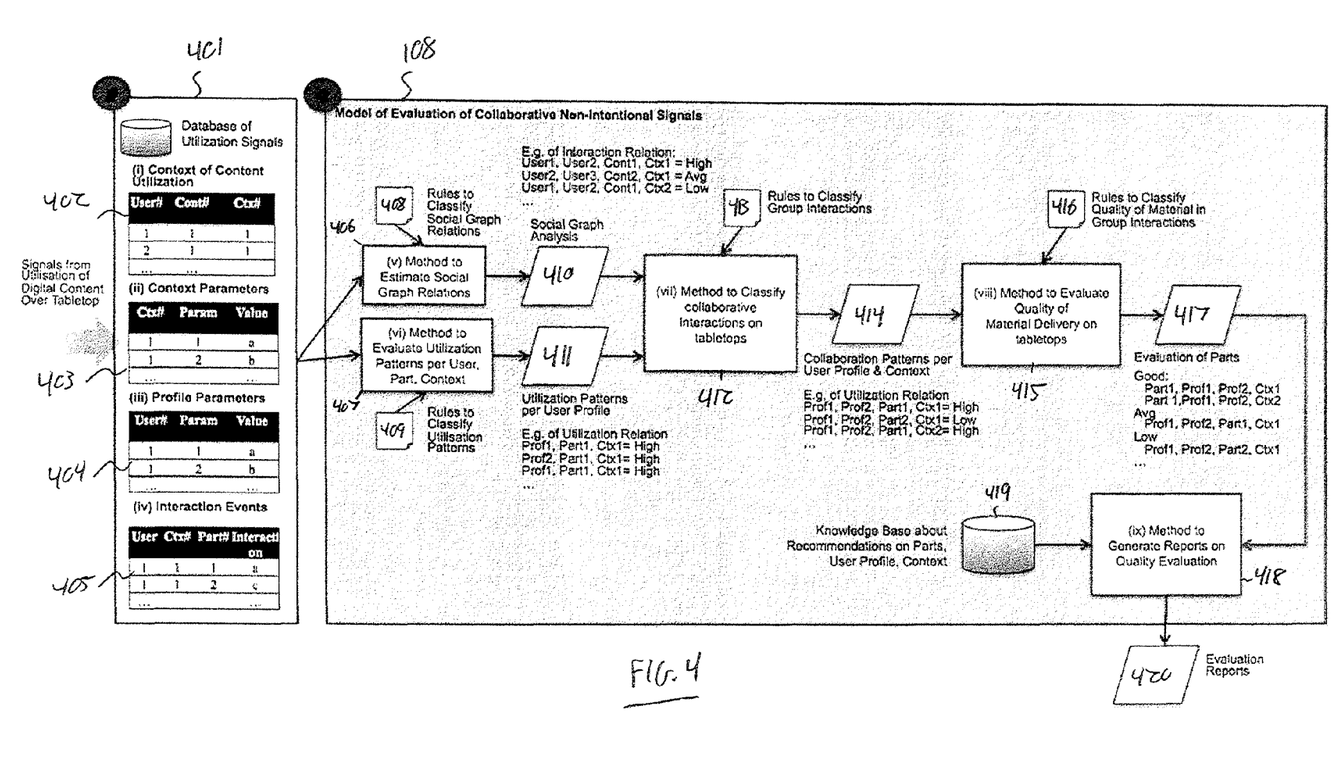
FIG. 4 is a flow diagram further describing the collaborative signal engine of FIGS. 1 and 3, according to an exemplary embodiment of the present invention.

FIG. 4 is a flow diagram further describing the collaborative signal engine of FIGS. 1 and 3, according to an exemplary embodiment of the present invention.

The process of evaluating the digital content 101 and providing a score indicating the quality of the digital content 101 is based on a combination of rule processing and mathematical and statistical models that correlate the different pieces of collected data.

As described above, a storage database 401, which may be included in the analytics module 105, may be used to store the non-intentional signals generated in response to the users interacting with the tabletop device 103, as well as the user profiles 109 indicating characteristics of the users. The data stored in the storage database 401 may be organized in a variety of manners including, for example, organizing data using multiple tables. For example, in FIG. 4, the storage database 401 includes four tables 402-405. It is to be understood that the tables described with reference to the storage database 401 are exemplary, and the storage database 401 is not limited thereto.

Table 402 corresponds to the context of content utilization. The context of content utilization indicates the relationship context in which users are co-utilizing digital content 101. For example, in table 402 shown in FIG. 4, user #1 and user #2 are both using content #1 in context #1.

Table 403 corresponds to context parameters. The context parameters provide classification for parameters in a given context. That is, the context parameters define each context.

Each context may include a plurality of context parameters, each having different values. Exemplary context parameters may include, for example, location, time, emergency (e.g. having a value of YES or NO), daylight (e.g., having a value of YES or NO), etc.

Table 404 corresponds to profile parameters. The profile parameters provide classification for parameters in a given user profile 109. That is, the profile parameters define characteristics of each user. Each user profile may include a plurality of profile parameters, each having different values. Exemplary profile parameters may include, for example, age, income, technical skill level, etc.

Table 405 corresponds to interaction events involving specific parts (e.g., data objects) in different contexts. That is, table 405 provides a record of user interaction with distinct content parts in a context. For example, user #1 may have a "high degree" of interaction with part #1 in context #1, a "low degree" of interaction with part #1 in context #2, etc.

Data from the storage database 401 is transmitted to a social graph relations module 406 and a pattern evaluation module 407 in the user-specific signal engine 107.

The social graph relations module 406 utilizes a first rule set 408, including rules to classify social graph relations, and statistical models to classify the relationship between users using content in a same context. Social graph analysis may be performed at block 410. Examples of interaction relationships may include relationships indicating that there is a "high" connection level between user #1 and user #2 when working on content #1 in context #1, that there is an "average" connection level between user #2 and user #3 when working on content #2 in context #1, and that there is a "low" connection level between user #1 and user #2 when working on content #1 in context #2.

The pattern evaluation module 407 utilizes a second rule set 409 to classify utilization patterns, and statistical models to classify the relationship between user profiles, content utilization, and context. Analysis may be performed at block 411. Examples of utilization patterns may include patterns indicating that users with user profile #1 use part #1 in context #1 with a "high degree" of activity, and that users with profile #2 use part #1 in context #1 with a "high degree" of activity.

A collaborative classification module 412 utilizes a third rule set 413 to classify group interactions, and statistical models to generate collaboration patterns based on user profiles and context. These collaboration patterns relate patterns of utilization between user profiles for a given context. Analysis may be performed at block 414. Examples of collaboration patterns based on user profiles and context may include patterns indicating that users having user profiles #1 and #2 that are using part #1 of the digital content 101 in context #1 have a "high degree" of interaction, that users having user profiles #1 and #2 that are using part #2 of the digital content 101 in context #1 have a "low degree" of interaction, and that users having user profiles #1 and #2 that are using part #1 of the digital content 101 in context #2 have a "high degree" of interaction.

A quality evaluation module 415 utilizes a fourth rule set 416 and statistical models to further evaluate the results from block 414, and to evaluate the quality of the digital content 101 based on group interactions. For example, the quality evaluation module 415 may determine how effectively specific parts (e.g., data objects) of the digital content 101 contribute to stimulating collaboration in a given context. For example, the quality evaluation module 415 may determine that part #1 does a good job of stimulating collaboration between users having user profiles #1 and #2 in contexts #1 and #2, or does an average job stimulating collaboration between users having profiles #1 and #2 in context #1, and that part #2 does a poor job stimulating collaboration between users having profiles #1 and #2 in context #1.

A report generation module 418 receives data from a recommendations knowledgebase 419, and generates quality evaluation reports 420 based on this data and the data received from block 417. For example, if it has been determined that part #3 of the digital content 101 provides low performance in regards to stimulating collaboration between users having user profiles #1 and #2 when utilized in context #1, the generated quality evaluation report 420 may include a recommendation to adjust the use of part #3 in context #1.

Figure 5:
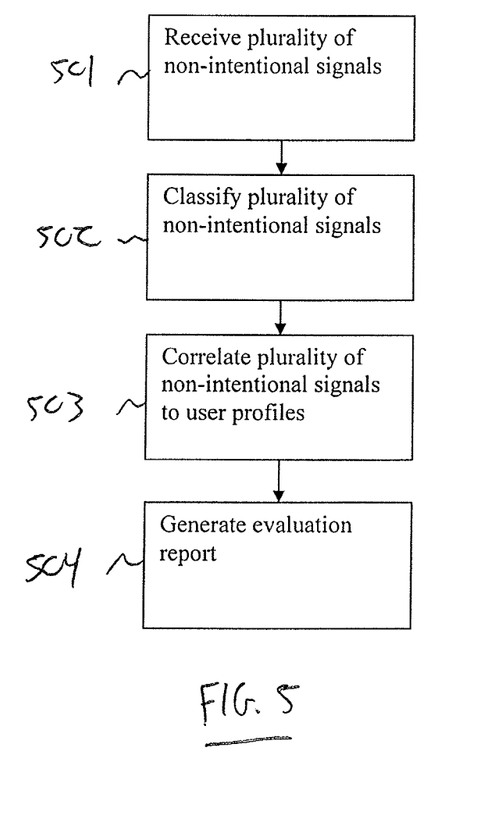
FIG. 5 is a flowchart showing a method of evaluating digital content displayed on a tabletop device, according to an exemplary embodiment of the present invention.

FIG. 5 is a flowchart showing a method of evaluating digital content displayed on a tabletop device, according to an exemplary embodiment of the present invention.

At block 501, a plurality of non-intentional signals is received. The plurality of non-intentional signals is generated in response to a plurality of users interacting with the digital content 101 displayed on the tabletop device 103, and/or interacting with each other while using the tabletop device 103. At block 502, the plurality of non-intentional signals is classified into a first set of data including user-specific non-intentional signals and a second set of data including collaborative non-intentional signals.

Each of the user-specific non-intentional signals corresponds to an individual touch interaction occurring between one user and the digital content. The individual touch interaction may include, for example, a user touching a data object of the digital content 101.

Each of the collaborative non-intentional signals corresponds to a collaborative action occurring between at least two users. The collaborative action may include a collaborative touch interaction occurring between the at least two users and the digital content 101, and/or a verbal interchange occurring between the at least two users. The collaborative touch interaction may include, for example, sharing data objects of the digital content between the at least two users.

At block 503, the plurality of non-intentional signals is correlated to user profiles corresponding to the plurality of users. At block 504, an evaluation report is generated. The evaluation report includes information indicating a collaborative quality of the digital content based on the plurality of non-intentional signals and a correlation of the plurality of non-intentional signals to the user profiles.

As described above, according to exemplary embodiments of the present invention, when digital content 101 is consumed in a collaborative environment using a tabletop device 103, non-intentional signals (e.g., user-specific non-intentional signals, and collaborative non-intentional signals including speech communication data) generated while using the digital content 101 are analyzed to rate the quality of the digital content 101 in a non-subjective manner. Rating the quality of the digital content 101 allows for reconsideration of the implementation of the digital content 101, as well as optimization and adjustment of the design and substance of the digital content 101.

According to exemplary embodiments of the present invention, non-intentional signals are collected, indexed, grouped, and analyzed, and are correlated to user profiles 109 and social setting information. In an educational environment, social setting information may include, for example, information relating to groups of students, the manner in which the students are disposed in classes, and the parameters related to the students' social relationships with each other. This data may be used to generate a report summarizing group reaction toward the digital content 101. Factors indicating group reaction may include, for example, organization of memory and learning, focus and attention, perception, categorization and preference, motivation and performance, etc. In addition, the generated reports may include information relating to exhibited collaborative patterns such as, for example, group synergy, cooperation and mentoring. The generated reports may be utilized to evaluate the quality of the digital content 101 by, for example, indicating ways in which the digital content 101 may be potentially improved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
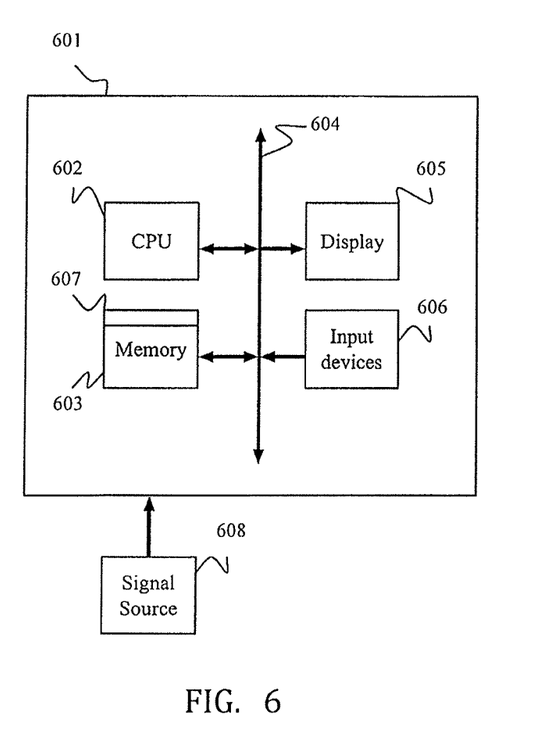
FIG. 6 illustrates a computer system for implementing aspects of exemplary embodiments of the present invention.

Referring to FIG. 6, according to an exemplary embodiment of the present invention, a computer system 601 for implementing aspects of the present invention can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described exemplary embodiments of the present invention, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A method of evaluating digital content displayed on an electronic tabletop device, comprising:
   receiving a plurality of non-intentional signals generated in response to a plurality of users interacting with at least one of the digital content displayed on the electronic tabletop device and each other;
   classifying the plurality of non-intentional signals into a first set of data comprising user-specific non-intentional signals and a second set of data comprising collaborative non-intentional signals,
   wherein each of the user-specific non-intentional signals corresponds to an individual touch interaction occurring between one user from among the plurality of users and the digital content, and each of the collaborative non-intentional signals corresponds to a collaborative action occurring between at least two users from among the plurality of users,
   wherein the collaborative action comprises the at least two users interacting with one another while the at least two users are also Interacting with the digital content,
   wherein the collaborative action comprises a collaborative touch interaction occurring between the at least two users and the digital content, and a verbal interaction occurring between the at least two users;
   correlating the plurality of non-intentional signals to user profiles corresponding to the plurality of users; and
   generating an evaluation report including information Indicating a collaborative quality of the digital content based on the plurality of non-intentional signals and a correlation of the plurality of non-intentional signals to the user profiles.

2. The method of claim 1, wherein the collaborative touch interaction occurring between the at least two users and the digital content comprises sharing data objects of the digital content between the at least two users.

3. The method of claim 1, further comprising:
   recording speech communication data corresponding to the verbal interaction occurring between the at least two users.

4. The method of claim 1, wherein the individual touch interaction comprises touching a data object of the digital content.

5. The method of claim 1,
   wherein the electronic tabletop device is a first electronic tabletop device, wherein the plurality of users comprises a first group of collocated users interacting with the digital content using the first electronic tabletop device at a first location, and a second group of remotely located users interacting with the digital content using a second electronic tabletop device at a second location, different from the first location,
   wherein the first and second electronic tabletop devices are in communication with and are synchronized with each other.

6. The method of claim 1, further comprising:
   constructing a weighted social graph using the collaborative non-intentional signals and the user profiles,
   wherein nodes of the weighted social graph represent the plurality of users, and weighted links connecting the nodes represent a quality of collaboration between the respective nodes,
   wherein the weighted social graph indicates the collaborative quality of the digital content.

7. A method of evaluating digital content displayed on an electronic device, comprising:
   receiving a plurality of non-intentional signals generated in response to a plurality of users interacting with at least, one of the digital content and each other, wherein the plurality of non-intentional signals are provided by the users non-intentionally while the users are interacting with the digital content;
   analyzing the received plurality of non-intentional signals;
   classifying the plurality of non-intentional signals into a first set of data comprising user-specific non-intentional signals and a second set of data comprising collaborative non-intentional signals,
   wherein each of the user-specific non-intentional signals corresponds to an individual touch interaction occurring between one user from among the plurality of user and the digital content, and each of the collaborative non-intentional signals corresponds to a collaborative action occurring between at least two users from among the plurality of users,
   wherein the collaborative action comprises the at least two users interacting with one another while the at least two users are also interacting with the digital content,
   wherein the collaborative action comprises a collaborative touch interaction occurring between the at least two users and the digital content, and a verbal interaction occurring between the at least two users; and
   generating an evaluation report including information indicating a collaborative quality of the digital content based on an analysis of the plurality of non-intentional signals.

8. A computer program product for evaluating digital content displayed on an electronic tabletop device, the computer program product comprising a non-transitory computer readable storage medium having program instructions embodied therewith, the program instructions executable by a processor to cause the processor to perform a method comprising:

receiving a plurality of non-intentional signals generated in response to a plurality of users interacting with at least one of the digital content displayed on the electronic tabletop device and each other;

classifying the plurality of non-intentional signals into a first set of data comprising user-specific non-intentional signals and a second set of data comprising collaborative non-intentional signals,     wherein each of the user-specific non-intentional signals corresponds to an individual touch interaction occurring between one user from among the plurality of users and the digital content, and each of the collaborative non-intentional signals corresponds to a collaborative action occurring between at least two users from among the plurality of users,     wherein the collaborative action comprises the at least two users Interacting with one another while the at least two users are also interacting with the digital content,     wherein the collaborative action comprises a collaborative touch interaction occurring between the at least two users and the digital content, and a verbal interaction occurring between the at least two users;

correlating the plurality of non-intentional signals to user profiles corresponding to the plurality of users; and     generating an evaluation report including information indicating a collaborative quality of the digital content based on the plurality of non-intentional signals and a correlation of the plurality of non-intentional signals to the user profiles.

9. The computer program product of claim 8, wherein the collaborative touch interaction occurring between the at least two users and the digital content comprises sharing data objects of the digital content between the at least two users.

10. The computer program product of claim 8, wherein the method further comprises:

recording speech communication data corresponding to the verbal interaction occurring between the at least two users.

11. The computer program product of claim 8, wherein the Individual touch interaction comprises touching a data object of the digital content.

12. The computer program product of claim 8, wherein the electronic tabletop device is a first electronic tabletop device,     wherein the plurality of users comprises a first group of co-located users interacting with the digital content using the first electronic tabletop device at a first location, and a second group of remotely located users interacting with the digital content using a second electronic tabletop device at a second location, different from the first location,     wherein the first and second electronic tabletop devices are in communication with and are synchronized with each other.

13. The computer program product of claim 8, wherein the method further comprises:

constructing a weighted social graph using the collaborative non-intentional signals and the user profiles,     wherein nodes of the weighted social graph represent the plurality of users, and weighted links connecting the nodes represent a quality of collaboration between the respective nodes,     wherein the weighted social graph indicates the collaborative quality of the digital content.

* * * * *